(12) United States Patent
Bouvier des Noes (10) Patent No.: US 8,873,605 B2
(45) Date of Patent: Oct. 28, 2014

(54) METHOD OF BLIND ESTIMATION OF A SCRAMBLING CODE OF A WCDMA UPLINK

(71) Applicant: Commissariat a l'Energie Atomique et aux ene alt, Paris (FR)

(72) Inventor: Mathieu Bouvier des Noes, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 13/792,645

(22) Filed: Mar. 11, 2013

(65) Prior Publication Data

US 2013/0243041 A1 Sep. 19, 2013

(30) Foreign Application Priority Data

Mar. 15, 2012 (FR) ...................... 12 52338

(51) Int. Cl.
*H04B 1/00* (2006.01)
*H04B 1/7073* (2011.01)
*H04B 1/7097* (2011.01)

(52) U.S. Cl.
CPC .......... *H04B 1/7097* (2013.01); *H04B 1/70735* (2013.01)
USPC ........... 375/144; 375/130; 375/140; 375/141; 375/145; 375/147; 375/148; 375/149; 375/316; 375/341; 375/342; 714/794; 714/795; 714/796; 370/320; 370/335; 370/342; 370/441; 370/476; 370/479

(58) Field of Classification Search
CPC .......................... H04B 1/7097; H04B 1/70735
USPC ......... 375/130, 140, 141, 144, 145, 147, 148, 375/149, 316, 341, 342; 714/794, 795, 796; 370/320, 335, 342, 441, 476, 479
See application file for complete search history.

(56) References Cited

U.S. PATENT DOCUMENTS

| 2003/0223398 A1* | 12/2003 | Haim et al. .................... 370/342 |
| 2007/0206638 A1* | 9/2007 | Santoru et al. ................ 370/476 |

FOREIGN PATENT DOCUMENTS

WO WO 2008/049713 A1 5/2008

OTHER PUBLICATIONS

European Search Report issued Mar. 23, 2013 in Patent Application No. 13 15 8687 with English Translation of Category of Cited Documents.

(Continued)

*Primary Examiner* — Leon Flores
(74) *Attorney, Agent, or Firm* — Oblon, Spivak, McClelland, Maier & Neustadt, L.L.P.

(57) ABSTRACT

A method for estimating a scrambling code used on an uplink of a WCDMA system. The scrambling code is obtained from a Gold code, sum of a first specific M-sequence of the user and of a second M-sequence known from the receiver. After sampling of the signal received at the chip frequency of the scrambling code, the successive samples are subject to a differential treatment and the sequence of differential values is multiplied by the second M-sequence. The observables thereby obtained are decoded with the aid of a belief propagation iterative decoding. The decoded values then serve to determine the content of the shift register of the generator of the first M-sequence. One then deduces therefrom the Gold code and an estimation of the scrambling code, $\hat{C}$.

9 Claims, 5 Drawing Sheets

(56) References Cited

OTHER PUBLICATIONS

Reza Moosavi et al., "A Fast Scheme for Blind Identification of Channel Codes", Global Telecommunications Conference (Globecom 2011), XP-032118709, Dec. 5, 2011, pp. 1-5.

ETSI TS 125 213 v4.4.0 (Dec. 2003), "Spreading and Modulation (FDD)", 3$^{rd}$ Generation Partnership Project, Technical Specification Group Radio Access Network, Release 4, 28 pages.

Keith M. Chugg at al., "A New Approach to Rapid PN Code Acquisition Using Iterative Message Passing Techniques", IEEE Journal on Selected Areas in Communications, vol. 23, No. 5, May 2005, pp. 884-897.

B. Arazi, "Decimation of $m$-Sequences leading to any Desired Phase Shift", Electronics Letters, vol. 13, No. 7, Mar. 31, 1977, pp. 213-215.

U.S. Appl. No. 13/792,726, filed Mar. 11, 2013, Bouvier Des Noes.

* cited by examiner

BACKGROUND ART

METHOD OF BLIND ESTIMATION OF A SCRAMBLING CODE OF A WCDMA UPLINK

TECHNICAL FIELD

The present invention relates to the field of mobile telecommunications and more particularly that of the reduction of interference in a femto-cellular network.

PRIOR ART

The communications in a femto-cellular network can be affected by interference generated by the communications of a neighbouring macro-cell.

Figure 1:
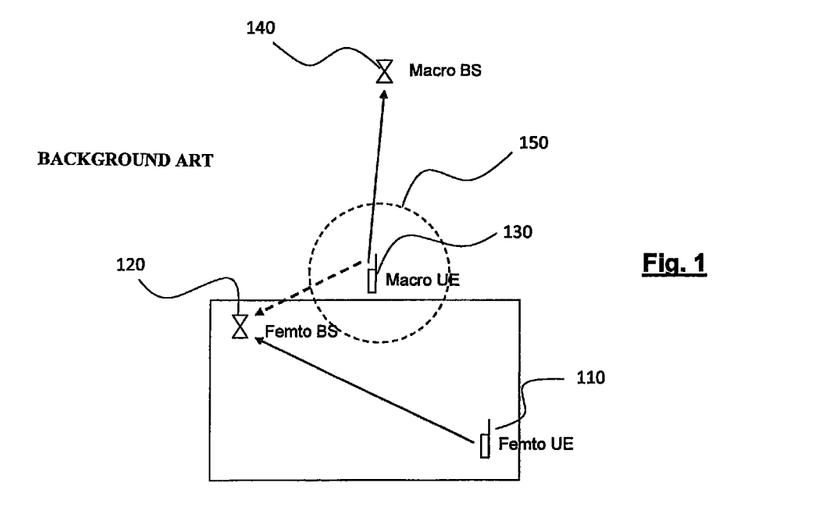
FIG. 1, already described, illustrates a situation of interference between a femto-cell and a macro-cell.

FIG. 1 shows a conventional scenario of interference between a terminal attached to a femto-cell ("Femto UE"), 110, and a terminal attached to a macro-cell ("Macro UE"), 130. We assume that a first uplink is established in the femto-cell (from the terminal 110 to the "Femto BS" base station, 120) and that a second uplink is established in a neighbouring macro-cell (from the terminal 130 to the "Macro BS" base station, 140). If the terminal 130 is alongside the macro-cell, it will have to transmit with an important power, which will generate an important interference at the femto-cell and could render impossible communication between the terminal 110 and the base station 120. In other words, a user ("Macro-UE") of a macro-cellular network creates around itself a dead zone, 150, in the femto-cellular network.

In order to eliminate interference, it is essential to determine the scrambling code used on the uplink of the terminal 130. In fact, there does not exist in the literature an algorithm of multi-user detection in blind mode that can disregard the scrambling code. Detection in blind mode is taken to mean that the femto-cellular base station 120 does not receive information from the macro-cell and particularly not the transmission parameters of the different users of the macro-cell.

On the other hand, since the scrambling code is known, it is possible to estimate locally the signal received from the terminal 130 and to subtract its contribution in the receiver of the terminal 120.

When the macro-cellular network is of the WCDMA type, the determination in blind mode is made even more complex by the fact that each user of said system uses a specific scrambling code. Moreover, the signal transmitted by the user being spectrally spread, the estimation of the scrambling code must be carried out at low signal to noise level.

An aim of the present invention is to propose a method for determining a scrambling code used by an uplink of a WCDMA system, for example to eliminate the interference generated in a neighbouring femto-cell.

DESCRIPTION OF THE INVENTION

The present invention is defined as a scrambling code estimation method used on an uplink of a terminal in a WCDMA system, the signal transmitted by the terminal on said link being transmitted in the form of frames and scrambled by means of the scrambling code, the scrambling code being constructed from a Gold sequence ($z_n$) obtained as sum of a first ($x_n$) and of a second (y) sequences of maximal length, in which:
- one samples, at the chip frequency of the scrambling code, the signal received by a receiver;
- one performs a differential processing of the samples thus obtained, said differential processing comprising the calculation of the Hermitian product of successive samples and the calculation of the imaginary part of said product, the differential processing supplying a sequence of differential values (v(k));
- one multiplies the sequence of differential values by a decimated and shifted version of the second sequence ($\tilde{y}$), known from the receiver, to obtain a sequence of observables ($\epsilon(k)$);
- one performs an iterative decoding of the sequence of observables to obtain a shifted and decimated version of the first sequence ($\tilde{x}_n$);
- one determines, at a given instant, the content ($SR^x$) of the shift register of the generator of the first sequence, and one deduces therefrom the scrambling code.

Advantageously, one verifies that the receiver is well synchronised with respect to the scrambling code by:
- calculating from the scrambling code a sequence of differential values $\hat{\mu}(k) = \hat{C}_1(2k+1)\hat{C}_1(2k)\hat{C}_2(2k)$ where $\hat{C}_1, \hat{C}_2$ are two components of the scrambling code;
- correlating on a predetermined number of samples the differential values with the differential values calculated at the preceding step;
- determining whether the result of said correlation is above a predetermined threshold.

In the differential processing, the differential values are obtained by $v(k) = -\text{Im}(u(2k))$ with $u(2k) = r(2k+1)r(2k)^*$ where $r(2k)$, $r(2k+1)$ are successive samples of the signal received.

The decimated and shifted version, $\tilde{y}$, of the second sequence is obtained from the second sequence y by means of:

$$\tilde{y}(k) = y(2k) + y(2k+1) + y(2k+4) + y(2k+6) + y(2k+17).$$

Advantageously, said iterative decoding is a decoding by passing belief messages between nodes of variables and nodes of constraints, said constraints being supplied by the generator polynomial of the first sequence.

The scrambling code is advantageously estimated by:
- determining the content ($SR_{Fib}^{\tilde{x}}$) of the shift register of a generator of said shifted and decimated version ($\tilde{x}$) of the first sequence, according to a Fibonacci representation;
- determining the content ($SR_{Fib}^{x'}$) of the shift register of a generator of a shifted and non-decimated version of the first sequence in the Fibonacci representation, from the content obtained at the preceding step;
- determining the content ($SR_{Fib}^{x}$) of the shift register of the generator of the first sequence in a Fibonacci representation, from the content obtained at the preceding step;
- calculating said Gold sequence ($z_n$) as sum of the first sequence obtained at the preceding step, and of the second sequence;
- deducing the scrambling code from the Gold code obtained at the preceding step.

The invention relates to, in a second embodiment, a scrambling code estimation method used on an uplink of a terminal in a WCDMA system, the signal transmitted by the terminal on said link being transmitted in the form of frames and scrambled by means of the scrambling code, the scrambling code being constructed from a Gold sequence ($z_n$) obtained as sum of a first ($x_n$) and of a second (y) sequences of maximal length, in which:
- one samples, at the chip frequency of the scrambling code, the signal received by a receiver;
- one performs a differential processing of the samples thus obtained, said differential processing comprising the calculation of the Hermitian product of successive samples and the calculation of the imaginary part of said product, the differential processing supplying a sequence of observable values (v(k));

one performs an iterative decoding of the sequence of observables to obtain a third sequence (a), sum of a shifted and decimated version of the first sequence ($\tilde{x}$) and of a shifted and decimated version of the second sequence ($\tilde{y}$));

one determines the content ($SR_{Gal}^a$) of the shift register of the generator of the third sequence according to a Galois representation;

one determines, from the content obtained at the preceding step, the respective contents ($SR_{Fib}^{\tilde{x}}, SR_{Fib}^{\tilde{y}}$) of the shift register of the generator of a shifted and decimated version of the first sequence ($\tilde{x}_n$) and of the shift register of the generator of a shifted and decimated version of the second sequence ($\tilde{y}$), in a Galois representation, and one deduces therefrom the respective contents of the shift registers in a Fibonacci representation;

one determines, at a given measuring instant, from the contents of the registers in a Fibonacci representation obtained at the preceding step, the respective contents ($SR_{Gal}^x, SR_{Gal}^y$) of the registers of generators of the first and second sequences ($x_n$, y) in a Fibonacci representation;

one deduces, from the contents of the registers obtained at the preceding step, the first and second sequences, then the scrambling code.

The content ($SR_{Gal}^a$) of the shift register of the generator of the third sequence according to a Galois representation may be determined from the content ($SR_{Fib}^a$) of the shift register of said generator in a Fibonacci representation, said content being itself obtained as the list of the first bits of the third sequence.

One deduces advantageously from the content of the register of the generator of the second sequence, at the start of frame, and from the content of this same register, determined at the instant of measure, a shift of said instant of measure with respect to the start of frame.

BRIEF DESCRIPTION OF DRAWINGS

Other characteristics and advantages of the invention will become clear on reading embodiments of the invention made with reference to the appended figures, among which.

DETAILED DESCRIPTION OF PARTICULAR EMBODIMENTS

The basic idea of the invention is to perform a blind estimation of the scrambling code from a differential multiplication of successive samples of the signal received.

Before precisely describing this blind estimation method, it should be recalled how transmission is carried out on an uplink of a WCDMA system.

Figure 2:
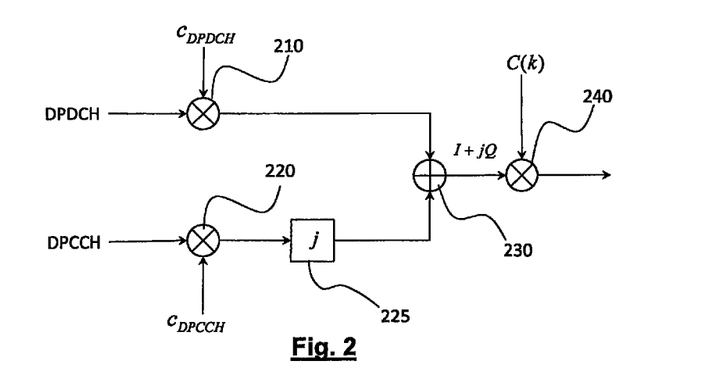
FIG. 2, illustrates in a schematic manner the structure of a transmitter on the uplink of a WCDMA system.

FIG. 2 illustrates in a schematic manner the structure of the transmitter for such an uplink.

The uplink is constituted of a data channel, called DPDCH (Dedicated Physical Data Channel), and a control channel, called DPCCH (Dedicated Physical Control Channel). The control channel transmits in particular transmission, channel estimation and power control parameters. The data and the control information items are transmitted in the form of frames, each frame comprising 15 transmission intervals and each transmission interval being constituted of 2560 chips.

The data are spread by means of a spreading code $c_{DPDCH}$ and the control information items are spread by means of a spreading code $c_{DPCCH}$. The codes $c_{DPDCH}$ and $C_{DPCCH}$ are orthogonal to separate the DPDCH and DPCCH channels. The WCDMA standard, described in particular in the ETSI document ETSI 3GP TS 25.213 v4.4.0 (2003-12), entitled "Spreading and modulation (FDD)", 3rd Generation Partnership Project, Technical Specification Group Radio Access Network, Release 4, specifies that the code $c_{DPCCH}$ is constituted of a sequence of bits equal to 1 and the code $c_{DPDCH}$ is constituted of pairs of identical bits, alternatively equal to 1 and to −1.

One assumes in FIG. 2 that the data, control information items and spreading codes are in BPSK format. The data are multiplied in 210 by the spreading code $c_{DPDCH}$ and the control information items are multiplied in 220 by the spreading code $c_{DPCCH}$.

The spread data are then multiplexed on the I and Q channels (multiplication by j in 225 on the DPDCH channel and summation in 230) and the complex signal I+jQ thereby obtained is multiplied in 240 by a complex scrambling code, C, defined by:

$$C(k) = C_1(k)\left(1 + j(-1)^k C_2\left(2\left\lfloor\frac{k}{2}\right\rfloor\right)\right), \quad (1)$$
$$k = 0, \ldots, 2^{25} - 2$$

Where the components $C_1$ and $C_2$ are constructed from a Gold sequence $Z_n$:

$$C_1(k) = Z_n(k) \quad (2\text{-}1)$$

$$C_2(k) = Z_n(k+16777232) \bmod.(2^{25}-1) \quad (2\text{-}2)$$

the Gold sequence $Z_n$ being itself obtained with the aid of two sequences of maximal length, noted $x_n$ and y $$Z_n = 2z_n(k) - 1 \quad (3\text{-}1)$$

$$z_n(k) = x_n(k) + y(k) \quad (3\text{-}2)$$

In the expressions (2-1), (2-2), (3-1) and (3-2), the symbols in upper case ($C_1, C_2, Z_n$) represent BPSK values $\{-1, +1\}$ and the symbols in lower case ($c_1, c_2, z_n, x_n, y$) their binary equivalents $\{0, 1\}$. Moreover, the addition in (3-2) is binary.

It will be recalled that a sequence of maximal length, or M-sequence, is obtained from a primitive polynomial. If the degree of said polynomial is m the period of the sequence is maximal, i.e. $2^m - 1$. In practice, an M-sequence is generated by means of a shift register (LFSR) with m stages, looped back on itself, the taps of the register corresponding to the coefficients of the generator polynomial. The M-sequences $x_n$ and y are respectively generated by means of generator polynomials $g(x) = x^{25} + x^{22} + 1$ and $h(x) = x^{25} + x^{24} + x^{23} + x^{22} + 1$, in other words, by recurrence relations:

$$x_n(k+25) = x_n(k+3) + x_n(k) \quad (4\text{-}1)$$

$$y(k+25) = y(k+3) + y(k+2) + y(k+1) + y(k) \quad (4\text{-}2)$$

The M-sequences $x_n$ and y are reinitialised at each start of frame, in other words every 38400 chips. The sequence y is initialised by placing all of the bits of the register at 1(y(0)=y(1)=...y(24)=1), i.e. by the word $SR^y=2^{25}-1$. The sequence $x_n$ is for its part initialised by a word of 25 bits, $SR^{x_n}$ dependent on the user. It is thus understood that the scrambling code C depends on the user. Said code is determined in an univocal manner if one knows the content of the shift register, $SR^{x_n}$, of the generator of C at start of frame.

We will place ourselves hereafter in the scenario represented in FIG. 2 when the macro-cellular system is of WCDMA type.

We will distinguish two embodiments depending on whether the base station 120 is synchronised beforehand or not on the signal transmitted by the terminal 130, in other words depending on whether the base station 120 has identified the start of frame.

For the sake of simplification but without prejudice to generalisation, we will assume hereafter that the channel between the terminal 130 and the base station 120 is AWGN. If the channel has multiple paths, the latter generate an additional interference that will be taken into account in the noise term.

The signal received by the base station 120 is of the following form:

$$r(k)=e^{i\theta}C(k)(\beta_d x_{DPDCH}(k)+j\beta_c x_{DPCCH}(k))+n(k) \quad (5)$$

where θ is the phase shift introduced by the channel, $\beta_d/\beta_c$ are real coefficients that are a function of the gain on the DPCCH and DPDCH channels, $x_{DPDCH}(k)$ and $x_{DPCCH}(k)$ are respectively the data and control signals after spreading (by the spreading codes $C_{DPDCH}$ and $c_{DPCCH}$ in 210 and 220 respectively), n(k) is a noise sample assumed additive, white, Gaussian, centred (AWGN), C(k) is the chip of the scrambling code generated at the instant $kT_c$ where $T_c$ is the chip period.

The present invention uses a differential processing of the signal received. Said signal, optionally filtered by means of a suitable filtering at the channel, is sampled at the chip frequency $1/T_c$. The differential treatment consists in carrying out the Hermitian product of two successive samples, i.e.:

$$u(k) = \qquad (6)$$
$$r(k+1)r(k)^* = C(k+1)C(k)^*(\beta_d x_{DPDCH}(k+1)+j\beta_c x_{DPCCH}(k+1))$$
$$(\beta_d x_{DPDCH}(k)-j\beta_c x_{DPCCH}(k))+$$
$$C(k+1)(\beta_d x_{DPDCH}(k+1)+j\beta_c x_{DPCCH}(k+1))n(k)^*+$$
$$C(k)^*(\beta_d x_{DPDCH}(k)-j\beta_c x_{DPCCH}(k))n(k+1)+n(k+1)n(k)^*$$

Given the spreading codes used for the DPDCH and DPCCH channels, $x_{DPDCH}(2k+1)x_{DPDCH}(2k)=1$ and $x_{DPCCH}(2k+1)x_{DPCCH}(2k)=1$. The successive chips of the scrambling code satisfy the relation:

$$C(2k+1)C(2k)^*=-2jC_1(2k+1)C_1(2k)C_2(2k) \quad (7)$$

The differential value u(2k) obtained at the instant $2kT_c$ (taking for origin the start of the frame) may be expressed in the following form:

$$u(2k)=-2j(\beta_c^2+\beta_d^2)C_1(2k+1)C_1(2k)C_2(2k)+b(2k) \quad (8)$$

where one has grouped together in b(2k) the three noise terms. If one denotes v(k)=−Im(u(2k)), v(k) is a real value representing, under a signed form (BPSK), the bits of the sequence a defined by:

$$a(k) = \frac{A(k)+1}{2} \quad (9\text{-}1)$$

with $$A(k)=C_1(2k+1)C_1(2k)C_2(2k) \quad (9\text{-}2)$$

In other words, if v(k) is positive, â(k)=1 and, if v(k) is negative, â(k)=0, where á(k) is the estimation of a(k).

From the definition of $C_1$ and $C_2$, cf. expressions (2-1), (2-2), (3-1) and (3-2), it may be shown that $a(k)=\tilde{x}_n(k)+\tilde{y}(k)$ with:

$$\tilde{x}_n(k)=x_n(2k)+x_n(2k+1)+x_n(2k+4)+x_n(2k+7)+x_n(2k+18) \quad (10\text{-}1)$$

$$\tilde{y}(k)=y(2k)+y(2k+1)+y(2k+4)+y(2k+6)+y(2k+17) \quad (10\text{-}2)$$

It can be shown that the decimation of an M-sequence by a power of 2 (here simply by a factor 2) is none other than a shifted version of said M-sequence. In the same way, the sum of two shifted versions of an M-sequence again leads to a shifted version of said M-sequence. Thus, the M-sequence $\tilde{x}_n$ has the same generator polynomial as $x_n$, only the content of the shift register during the initialisation at start of frame being different. In a similar manner, the M-sequence $\tilde{y}$ has the same generator polynomial as y, only the content of the shift register during the initialisation at start of frame being different.

If one now assumes that the receiver of the base station 120 is synchronised on the start of frame, it is possible to generate the sequence y(k) because one then knows the initial state $SR^y$ ($SR^y=2^{25}-1$) of the shift register of y(k) at the start of frame. One may deduce therefrom the sequence y(k) from the expression (10-2).

If one multiplies v(k) by $\tilde{Y}(k)=2\tilde{y}(k)-1$, one obtains the sequence of observables:

$$\epsilon(k)=v(k)\tilde{Y}(k)=2(\beta_c^2+\beta_d^2)\tilde{X}(k)+w(k) \quad (11)$$

where $\tilde{X}_n(k)=2\tilde{x}_n(k)-1$ and w(k) is a noise term, which has the same statistical properties as b(k).

Figure 3:
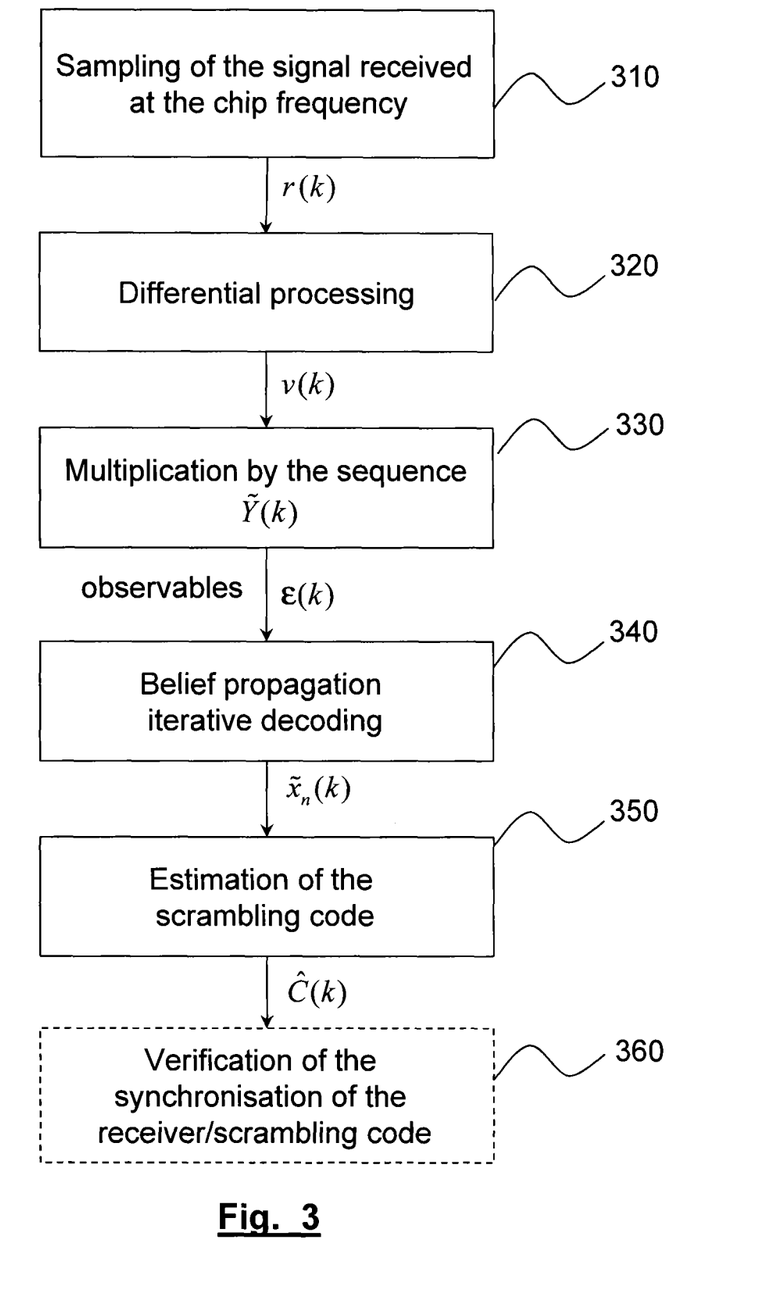
FIG. 3 represents in a schematic manner the method of determining a scrambling code according to a first embodiment of the invention.

As explained later, it is possible to decode $\tilde{x}_n(k)$ from the observation of ε(k). One may then determine the content of the register $SR^{\tilde{x}}$ of the generator of the sequence $\tilde{x}_n$ at the start of the frame and finally deducing therefrom the content of the register $SR^x$ of the generator of the sequence $x_n$ FIG. 3 represents in a schematic manner a method for estimating a scrambling code used on the uplink of a WCDMA system, according to a first embodiment of the invention.

In this first embodiment, we will assume that the receiver of the base station 120 is synchronised with respect to the signal transmitted by the terminal 130. According to this first embodiment, the receiver has either effectively identified beforehand the start of a frame, or made the assumption that a given sample corresponded to a start of frame. In the second case, the receiver could test in turn a series of samples and determine, with the aid of a step 360 described later, whether the assumption of synchronisation was well satisfied.

At step 310, one samples the signal received at the chip frequency of the scrambling code, $1/T_c$, if need be after a filtering matched to the transmission channel between the terminal 130 and the base station 120.

The samples r(k) thus obtained are subject to a differential processing in 320. More precisely, for each sample, one calculates the Hermitian product of said sample with the preceding sample. One then determines the imaginary part v(k)=−Im(u(2k)) of the products u(k) of even rank to obtain a sequence of imaginary parts v(k), called differential values.

At step 330, one multiplies the elements of the sequence of differential values with the elements of the M-sequence ŷ obtained as shifted version of the M-sequence y serving to form the Gold sequence $z_n$ of the scrambling code. One thereby obtains a sequence of observables ϵ(k), as expressed in (11).

At step 340, one performs an iterative decoding of the observables ϵ(k) from the preceding step to obtain an estimation of the sequence $\tilde{x}_n$. Given that the sequence of bits $\tilde{x}_n(k)$ is an M-sequence obtained by a generator polynomial, in this case g(x), it may be decoded by a belief propagation algorithm (belief propagation decoding) as described for example in the article of K. M. Chugg and M. Zhu entitled "A New Approach to Rapid PN Code Acquisition Using Iterative Message Passing Techniques", IEEE Journal on Selected Areas in Communications, vol. 25, no. 5, May 2005. In fact, the generator of an M-sequence of generator polynomial:

$$g(x)=g_0+g_1x+\ldots+g_rx^r \quad (12)$$

may be seen as a parity matrix encoder of size (M−r)×M:

$$H_{LFSR} = \begin{pmatrix} g_r & g_{r-1} & \cdots & g_1 & g_0 & 0 & 0 & 0 & \cdots & 0 \\ 0 & g_r & g_{r-1} & \ddots & g_1 & g_0 & 0 & 0 & \cdots & 0 \\ \vdots & \ddots & \ddots & \ddots & \ddots & \ddots & \ddots & \ddots & \ddots & 0 \\ 0 & 0 & \cdots & g_r & g_{r-1} & \cdots & g_1 & g_0 & \cdots & 0 \end{pmatrix} \quad (13)$$

where M is the number of successive bits considered at the output of the generator. This parity matrix reflects the constraints between the bits of the M-sequence. The generator of the M-sequence may be represented, following the example of LDPC encoders, by a series of variable nodes and a series of constraint nodes. The decoding then takes place in an iterative manner, by passing messages between the nodes of variables and the nodes of constraints.

In the present case, the observables are the values ϵ(k). The algorithm makes it possible to estimate at each iteration the soft values (for example the log likelihood ratios or LLRs) of the bits $\tilde{x}_n(k)$. The bits $\tilde{x}_n(k)$ are then obtained through a hard decision on these LLRs.

At step 350, one deduces from the preceding step the content $SR^x$ of the shift register at start of frame for the sequence $x_n$. This content defines in an univocal manner the sequence $x_n$, thus the Gold code $z_n = x_n + y$ and consequently the components $C_1, C_2$ of the scrambling code C from the relations (2-1), (2-2), (3-1) and (3-2). The scrambling code estimated at step 350 is noted Ĉ, its estimated components are noted $\hat{C}_1, \hat{C}_2$.

Figure 4:
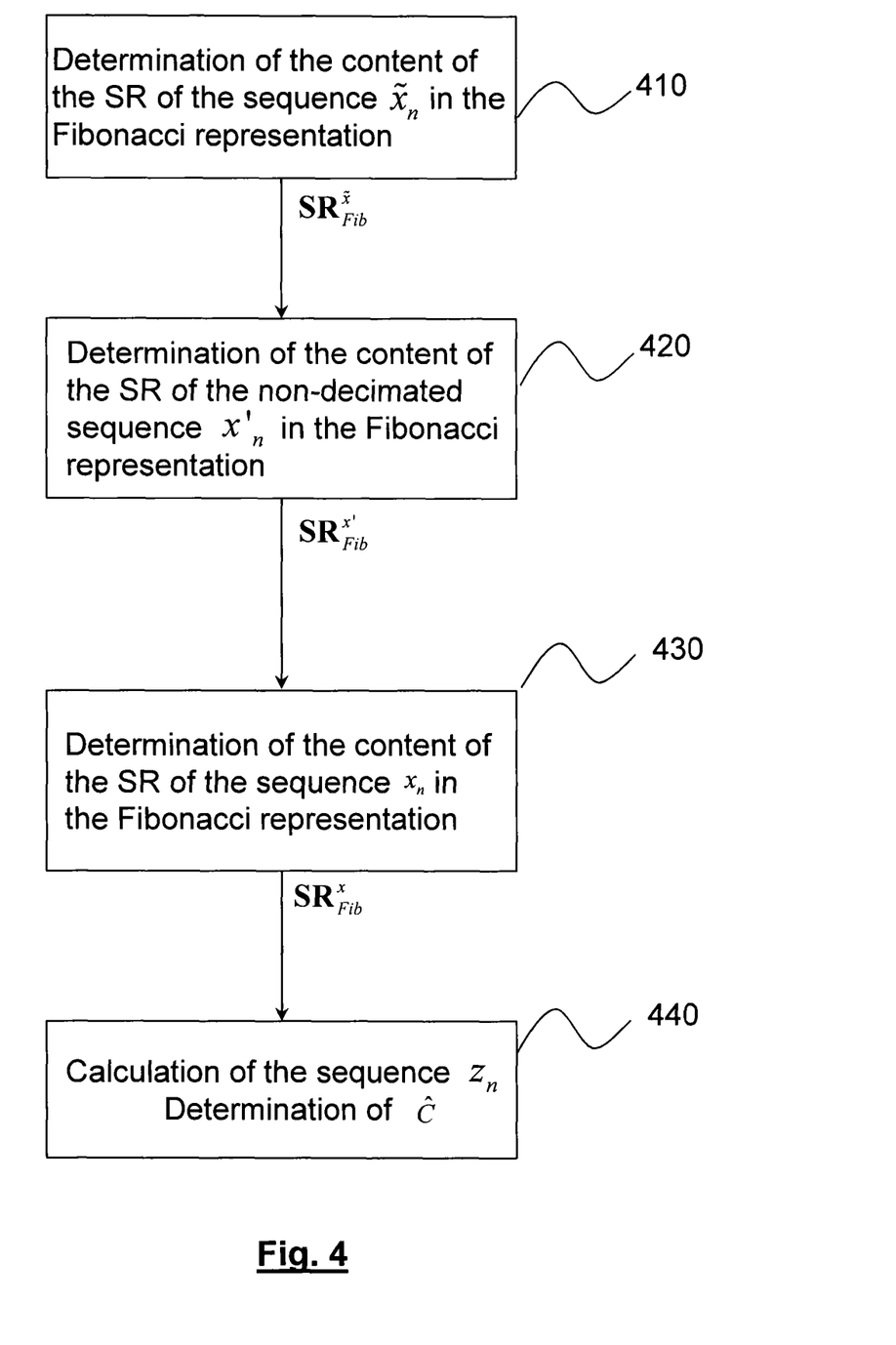
FIG. 4 represents in a schematic manner the details of step 350 in FIG. 3.

FIG. 4 schematically illustrates the details of step 350 according to an embodiment of the invention.

At step 410, one determines the content of the shift register, at start of frame, of the generator of the M-sequence $\tilde{x}_n$, in the Fibonacci representation. Given the connection between the stages of the register, the content of the shift register is the word formed by the first values $\tilde{x}_n(k)$, k=0, . . . , 24.

From the content of said shift register, one determines in 420 the content of the shift register of the generator of the non-decimated M-sequence.

It will be recalled that:

$$\tilde{x}_n(k)=x'_n(2k) \quad (14\text{-}1)$$

where $x'_n$ represents the non-decimated M-sequence that satisfies:

$$x'_n(k)=x_n(k)+x_n(k+1)+x_n(k+4)+x_n(k+7)+x_n(k+18) \quad (14\text{-}2)$$

As we have noted above, the sequence $\tilde{x}_n$ is of same generator polynomial as the original sequence $x_n$. In fact the sequence $x'_n$ obtained as sum of shifted versions of the M-sequence $x_n$ is an M-sequence of same generator polynomial as $x_n$, and $\tilde{x}_n$ obtained by decimation of a factor 2 of the sequence $x'_n$ is again an M-sequence of same generator polynomial as $x'_n$ and thus as $x_n$.

Figure 5A:
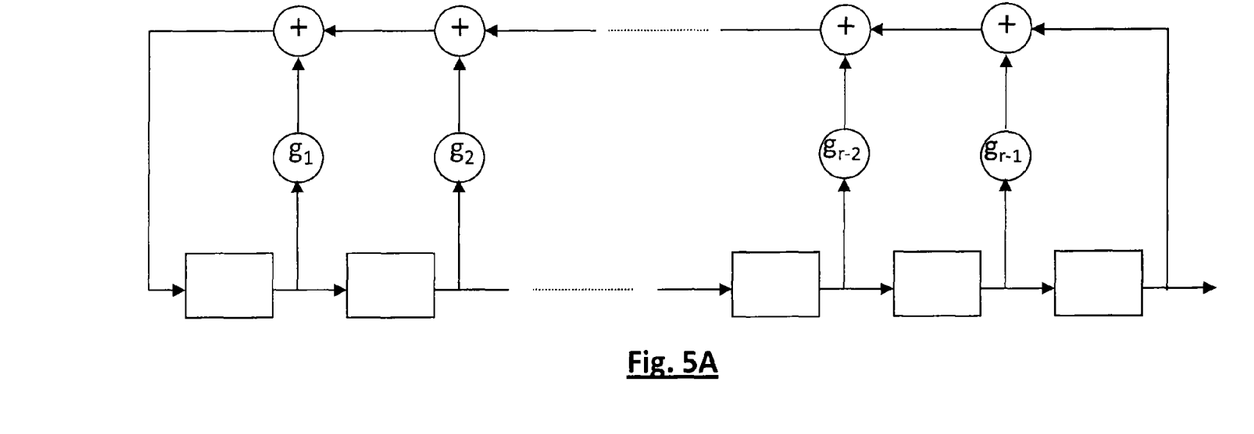
FIGS. 5A and 5B give the structure of a same generator of an M-sequence respectively in a Fibonacci representation and a Galois representation.

The content of the shift register of the decimated sequence $\tilde{x}_n$ may be obtained in a Fibonacci representation of the generator as illustrated in FIG. 5A. The Galois representation of the same generator is given in FIG. 5B. The content of the register in the Fibonacci representation may be obtained by means of the method described in the article of B. Arazi entitled "Decimation of m-sequences leading to any desired phase shift", published in Electronics Letters, Vol. 13, No. 7, March 1977.

More precisely, if one notes $SR_{Fib}^{x'}$ the vector of size r=25 giving the content of the shift register in the Fibonacci representation of the generator of the sequence $x'_n$, and $SR_{Fib}^{\tilde{x}}$ the content of the shift register for the decimated sequence $\tilde{x}_n$ one has:

$$SR_{Fib}^{x'}=T_{undecim}^{1/2}SR_{Fib}^{\tilde{x}} \quad (15)$$

where $T_{undecim}^{1/2}$ is a matrix of size r×r giving the change of state between the decimated sequence $\tilde{x}_n$ and the original sequence $x'_n$ for a decimation of factor ½.

The matrix $t_{undcim}^{1/2}$ may be obtained according to the method detailed in the article cited above. To do this, one calculates firstly $\alpha^{-1}$, the root of the inverse polynomial of the generator polynomial $(g^{-1}(x)=g(x)x^{-r}=x^{25}+x^3+1)$ of the non-decimated sequence, $T_{undecim}^{1/2}$ is then the binary matrix of which the $i^{th}$ line is given by the decomposition coefficients, $a_{i,k}$:

$$\alpha^{-ip} = \sum_{k=0}^{r} a_{i,k}\alpha^{-k} \quad (16)$$

where p is an integer satisfying the relation of congruence $2p \equiv 1 \mod(2^r-1)$, for example $p=2^{r-1}$.

It may be shown that the following relations are satisfied, respectively, for the even lines and the odd lines:

$$\alpha^{-2ip}=\alpha^{-i} \quad (17\text{-}1)$$

$$\alpha^{-(2i+1)p}=\alpha^{-p-i} \quad (17\text{-}2)$$

The even lines of the matrix $t_{undecim}^{1/2}$ are obtained directly from (16) and (17-1). For the odd lines, one calculates the remainder of the polynomial division of $\alpha^{-p-i}$ by the inverse polynomial $g^{-1}$, i.e.:

$$\alpha^{-p-i} = \sum_{k=0}^{r-1} c_{i,k}\alpha^{-k} \quad (18)$$

The odd line 2i+1 then being given by the coefficients $c_{i,k}$ by virtue of (16), (17-2) and (18).

One thereby obtains the content $SR_{Fib}^{x'}$ of the shift register for the non-decimated sequence, at start of frame.

One then deduces therefrom, at step 430, the content $SR_{Fib}^{x}$ of the shift register for the sequence $x_n$. If one notes F the state transition matrix of the generator of the sequence $x_n$ in the Fibonacci representation, in other words, the matrix giving the following state, $SR_{Fib}^{x}(k+1)$ (that is the content of the shift register at the instant $(k+1)T_c$) as a function of the current state, $SR_{Fib}^{x}(k)$, i.e.:

$$SR_{Fib}^{x}(k+1)=F\cdot SR_{Fib}^{x}(k) \quad (19)$$

with:

$$F = \begin{bmatrix} 0 & 1 & 0 & 0 & \ldots & 0 \\ 0 & 0 & 1 & 0 & \ldots & 0 \\ 0 & 0 & 0 & 1 & \ldots & 0 \\ \vdots & & \vdots & & \ldots & \vdots \\ 0 & 0 & 0 & 0 & \ldots & 1 \\ 1 & g_{r-1} & g_{r-2} & g_{r-3} & \cdots & g_1 \end{bmatrix} \quad (20)$$

The expression (14-2) is then translated into matrix form:

$$SR_{Fib}{}^{x'} = (F^{18} + F^7 + F^4 + F + I)SR_{Fib}{}^{x} \quad (21)$$

where the time index k has been omitted for the sake of simplicity.

In the end, the content $SR_{Fib}{}^{x}$ of the shift register for the sequence $x_n$ is obtained by:

$$\begin{aligned} SR_{Fib}{}^{x} &= (F^{18} + F^7 + F^4 + F + I)^{-1} SR_{Fib}{}^{x'} \\ &= \Omega T_{undecim}{}^{1/2} SR_{Fib}{}^{\tilde{x}} \end{aligned} \quad (22)$$

with: $\Omega = (F^{18} + F^7 + F^4 + F + I)^{-1}$ matrix that may be calculated once and for all and stored in a memory of the receiver.

If need be, an error control may be carried out at this stage. In fact, according to the standard, the most significant bit (MSB) in the shift register must be equal to 1 at start of frame. If said bit is not equal to 1, the estimation of the scrambling code C is then interrupted.

The content $SR_{Fib}{}^{x}$ of the shift register of the sequence $x_n$ at start of frame makes it possible to determine the elements $x_n(k)$ of the sequence. One deduces therefrom at step 440 the bits $z_n(k) = x_n(k) + y(k)$ of the Gold sequence then the components $\hat{C}_1(k)$, $\hat{C}_2(k)$ by means of the relations (2-1), (2-2) and finally the elements of the scrambling code $\hat{C}(k)$ by the expression (1).

Returning to FIG. 3, in an optional manner, one may verify in 360 whether the receiver of the base station 120 is well synchronised with the scrambling code of the terminal 130.

It will be recalled that at step 320, one obtains the differential values, cf. expression (8):

$$v(k) = 2(\beta_c^2 + \beta_d^2)C_1(2k+1)C_1(2k)C_2(2k) + b_1(2k) \quad (23)$$

where $b_1(2k)$ is a noise sample. The values $v(k)$ are called observed differential values.

Once the content $SR_{Fib}{}^{x}$ of the shift register of the sequence $x_n$ obtained, and the scrambling code $\hat{C}$ deduced at step 350, one may calculate the sequence $\hat{\mu}$ defined by:

$$\hat{\mu}(k) = \hat{C}_1(2k+1)\hat{C}_1(2k)\hat{C}_2(2k) \quad (24)$$

The values $\hat{\mu}(k)$ are called calculated differential values.

One then performs the correlation between the sequence v of the differential values with the sequence $\hat{\mu}$ of the calculated differential values, i.e.:

$$V = \sum_{k=0}^{L} v(k)\hat{\mu}(k) \quad (25)$$

the correlation being taken each time on a sequence of L samples.

On compares the result of the correlation V to a predetermined threshold, $\lambda$.

if $V > \lambda$ one concludes therefrom that the receiver is well synchronised with the scrambling code. Failing this, the receiver is not synchronised with the scrambling code.

Figure 6:
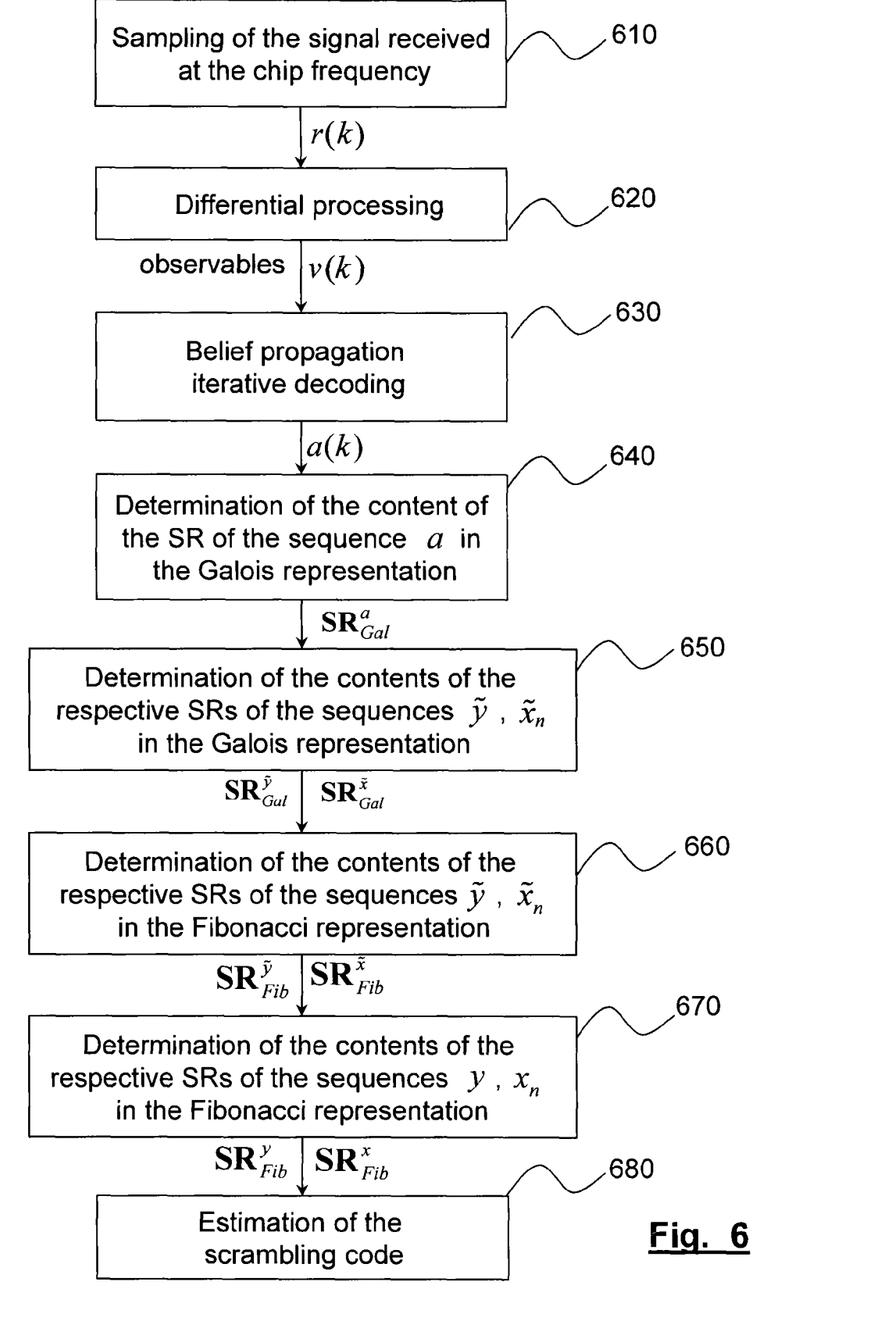
FIG. 6 represents in a schematic manner the method of determining a scrambling code according to a second embodiment of the invention.

FIG. 6 represents in a schematic manner a method of estimating a scrambling code used on the uplink of a WCDMA system, according to a second embodiment of the invention.

In this second embodiment, the receiver is not synchronised on the signal of the transmitter 130 and consequently does not know the start of the frames. It is thus incapable a priori of directly generating the M-sequence y and a fortiori the shifted sequence $\tilde{y}$.

The steps 610 and 620 are identical to the steps 310 and 320 described previously.

At the output of the differential processing in 620, one has differential values:

$$v(k) = 2(\beta_c^2 + \beta_d^2)A(k) + b_1(2k) \quad (26)$$

where $A(k) = C_1(2k+1)C_1(2k)C_2(2k)$ (cf. expression 9-2) is a signed representation of $a(k) = \tilde{x}_n(k) + \tilde{y}(k)$ and $\tilde{x}_n(k), \tilde{y}(k)$ are respectively defined by the expressions (10-1) and (10-2).

It may be shown that the sum sequence a is generated by the generator polynomial $g_a(x)$ equal to the product of the generator polynomials of the sequences $\tilde{x}$ and $\tilde{y}$:

$$g_a(x) = g(x)h(x) \quad (27)$$

At step 630, one performs an iterative decoding of the observables $v(k)$ to obtain an estimation of the sequence a. As at step 340, said decoding may be performed by a belief propagation algorithm. The decoding takes place, in a known manner per se, by passing messages between the nodes of variables and the nodes of constraints, the variables being observables $v(k)$ and the constraints being set by the generator polynomial $g_a(x)$.

One obtains at the end of the decoding a sequence of estimated bits.

The polynomial $g_a(x)$ being of degree 50, one may determine at each instant the content $SR_{Fib}{}^{a}$ of the register of the sequence a, in the Fibonacci representation (cf. FIG. 5A) as the list of the first 50 bits of said sequence.

The content $SR_{Gal}{}^{a}$ of the register of the sequence a in the Galois representation is determined at step 640.

Figure 5B:
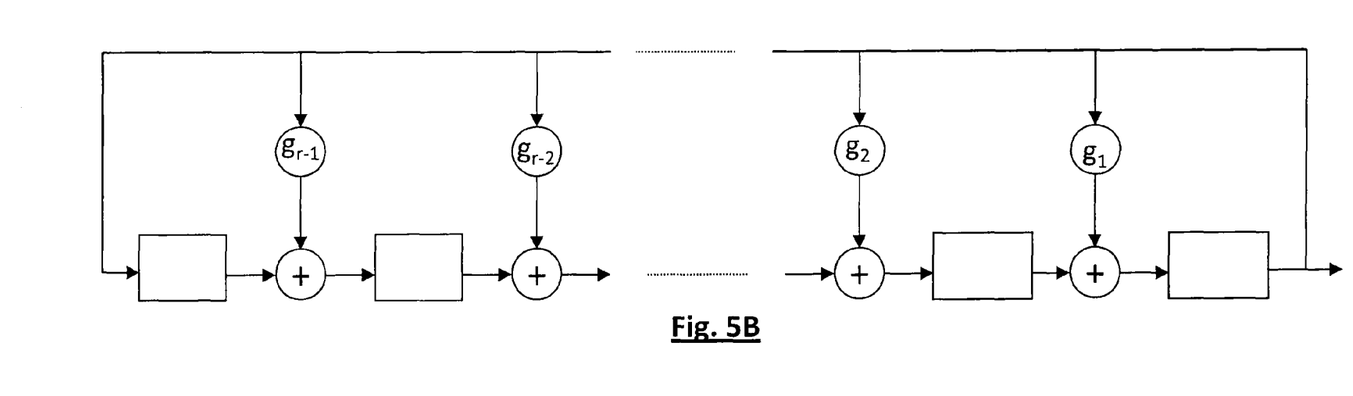

Generally speaking, if one notes $SR_{Fib}$ the content of the shift register of a sequence in the Fibonacci representation and $SR_{Gal}$ the content of the shift register of this same sequence in the Galois representation and if one notes $T^{GF}$ the matrix of transposition of states from the Fibonacci representation to that of Galois, one has:

$$SR_{Gal} = T^{GF} SR_{Fib} \quad (28)$$

where the elements of the transposition matrix are given by taking the notation conventions of FIGS. 5A and 5B:

$$T_{ij}{}^{GF} = g(i-j) \text{ if } j \le i \text{ and } T_{ij}{}^{GF} = 0 \text{ if not} \quad (29)$$

In the present case, $SR_{Gal}{}^{a} = T_{g_a}{}^{GF} SR_{Fib}{}^{a}$, where the matrix $T_{g_a}{}^{GF}$ is constructed from the coefficients of the polynomial $g_a(x)$ in the expression (29).

At step 650, one deduces from the state $SR_{Gal}{}^{a}$ of the register of the sequence a, the respective states of the registers of sequences $\tilde{x}_n$ and $\tilde{y}$ in the Galois representation.

If one notes in the polynomial form $$A_{reg}(x) = \sum_{i=0}^{50} a(i)x^i$$

the state of the register of the sequence a, $$\tilde{X}_{reg}(x) = \sum_{i=0}^{25} \tilde{x}(i)x^i$$

the state of the register of the sequence $\tilde{x}_n$ and $$\tilde{Y}_{reg}(x) = \sum_{i=0}^{25} \tilde{y}(i)x^i$$

the state of the register of the sequence $\tilde{y}$ in the Galois representation (cf. FIG. 5B), one has the relation:

$$A_{reg}(x) = g(x)\tilde{Y}_{reg}(x) + h(x)\tilde{X}_{reg}(x) \quad (30)$$

This relation can again be expressed, in an equivalent manner, in a matrix form:

$$SR_{Gal}^a = T_{Gold}\begin{pmatrix} SR_{Gal}^{\tilde{x}} \\ SR_{Gal}^{\tilde{y}} \end{pmatrix} \quad (31)$$

where:

$SR_{Gal}^a = (a_{Gal}(0), \ldots, a_{Gal}(49))^T$, $SR_{Gal}^{\tilde{x}} = (\tilde{x}_{Gal}(0), \ldots, \tilde{x}_{Gal}(24))^T$, $SR_{Gal}^{\tilde{y}} = (\tilde{y}_{Gal}(0), \ldots, \tilde{y}_{Gal}(24))^T$ are respectively the vectors giving the states of the registers of the sequences a, $\tilde{y}$ and $\tilde{x}_n$ at a given instant in the Galois representation and:

$$T_{Gold} = \begin{pmatrix} h(0) & 0 & \ldots & 0 & g(0) & 0 & \ldots & 0 \\ \vdots & h(0) & & \vdots & \vdots & g(0) & & \vdots \\ h(r) & \vdots & \ddots & 0 & g(r) & \vdots & \ddots & 0 \\ 0 & h(r) & & h(0) & 0 & g(r) & & g(0) \\ \vdots & & \ddots & \vdots & \vdots & & \ddots & \vdots \\ 0 & \ldots & 0 & h(r) & 0 & \ldots & 0 & g(r) \end{pmatrix} \quad (32)$$

One may then deduce the states of the registers $SR_{Gal}^{\tilde{x}}$ and $SR_{Gal}^{\tilde{y}}$ in the Galois representation by:

$$\begin{pmatrix} SR_{Gal}^{\tilde{x}} \\ SR_{Gal}^{\tilde{y}} \end{pmatrix} = T_{Gold}^{-1} SR_{Gal}^a \quad (33)$$

At step 660, one determines the content of the shift registers of the sequences $\tilde{y}$ and $\tilde{x}_n$ in the Fibonacci representation, noted $SR_{Fib}^{\tilde{y}}$ and $SR_{Fib}^{\tilde{x}}$.

The state of the register in the Fibonacci representation may in fact be from the state of the register in the Galois representation by means of the matrix $T^{GF}$ defined previously:

$$SR_{Fib} = (T^{GF})^{-1} SR_{Gal} \quad (34)$$

One may thus determine the state of the registers $SR_{Fib}^{\tilde{y}}$ and $SR_{Fib}^{\tilde{x}}$ in the following manner:

$$SR_{Fib}^{\tilde{y}} = (T_h^{GF})^{-1} SR_{Gal}^{\tilde{y}} \quad (35-1)$$

$$SR_{Fib}^{\tilde{x}} = (T_g^{GF})^{-1} SR_{Gal}^{\tilde{x}} \quad (35-2)$$

where $T_h^{GF}$ and $T_g^{GF}$ are the transposition matrices according to (33) for the polynomials h(x) and g(x) respectively.

At step 670, one determines the respective contents of the shift registers of the sequences y and $x_n$ from those of the sequences $\tilde{y}$ and $\tilde{x}_n$.

To do this, one proceeds as at step 420, except that one also estimates the content of the register of the sequence y, unknown here from the receiver, i.e.:

$$SR_{Fib}^x = \Omega_g T_{undecim}^{1/2} SR_{Fib}^{\tilde{x}} \quad (36-1)$$

$$SR_{Fib}^y = \Omega_h SR_{Fib}^{\tilde{y}} \quad (36-2)$$

where one has distinguished here the matrices $\Omega_g, \Omega_h$ et $T_{undecim,g}^{1/2}$ to recall that they depend on the coefficients of the generator polynomials g(x) and h(x) respectively. From the states $SR_{Fib}^x$ and $SR_{Fib}^y$ at a measuring instant $k_0 T_c$ one may determine the bits $x_n(k)$ and y(k) at an instant $kT_c$.

At step 680, one determines the scrambling code $\hat{C}$, in other words the values $\hat{C}(k)$ from the bits $x_n(k)$ and y(k) obtained at the preceding step, by means of the relations (2-1), (2-2), (3-1), (3-2).

One may moreover synchronise the receiver on the start of the frame given that one knows the state of the register of the sequence y at start of frame (initial state) and that at the instant of measure $k_0 T_c$. One applies as many times as necessary the change of state matrix (of the generator of the sequence y) to the initial content up to one finding $SR_{Fib}^y$ (obtained at the instant of the measure). If m is the number of successive applications of the change of state matrix to obtain $SR_{Fib}^y$, the shift of the measuring instant with respect to the start of the frame is none other than $mT_c$.

Knowing the scrambling code of the terminal 130 and its spreading code, the receiver of the base station 120 can estimate the symbols transmitted by the terminal. It can then regenerate the contribution to the signal received from said terminal, from the scrambling code, the spreading code, the shaping filter and from the impulse response of the channel. This contribution is then subtracted from the signal received, in a known manner per se, to eliminate the interference due to the terminal 130. If need be, this operation may be repeated in parallel or in series to eliminate the interference of several users of the WCDMA macro-cellular system.

The invention claimed is:

1. A scrambling code estimation method used on an uplink of a terminal in a Wideband Code Division Multiple Access (WCDMA) system, a signal transmitted by the terminal on said uplink being transmitted in frames and scrambled with a scrambling code, the scrambling code being constructed from a Gold sequence $(z_n)$ obtained as sum of a first $(x_n)$ and of a second (y) sequences of maximal length, said method comprising:
   sampling samples, at the chip frequency of the scrambling code, the signal received by a receiver;
   performing a differential processing of the samples, said differential processing comprising a Hermitian product of successive samples and a calculation of an imaginary part of said Hermitian product, the differential treatment supplying a sequence of differential values (v(k));
   multiplying the sequence of differential values by a decimated and shifted version of the second sequence ($\tilde{Y}$), known from the receiver, to obtain a sequence of observables ($\epsilon(k)$);
   performing an iterative decoding of the sequence of observables to obtain a shifted and decimated version of the first sequence ($\tilde{x}_n$); and
   determining, at a given instant, the content ($SR^x$) of a shift register of a generator of the first sequence, and one deduces therefrom the scrambling code.

2. The scrambling code estimation method according to claim 1, further comprising verifying that the receiver is well synchronised with respect to the scrambling code by:

calculating from the scrambling code a sequence of differential values $\hat{\mu}(k)=\hat{C}_1(2k+1)\hat{C}_1(2k)\hat{C}_2(2k)$ where $\hat{C}_1, \hat{C}_2$ are two components of the scrambling code;

correlating on a predetermined number of samples the differential values with the differential values calculated at the preceding step; and determining whether the result of said correlation is above a predetermined threshold.

3. The scrambling code estimation method according to claim 1, wherein, in the differential processing, the differential values are obtained by $v(k)=-\text{Im}(u(2k))$ with $u(2k)=r(2k+1)r(2k)^*$ where $r(2k), r(2k+1)$ are successive samples of the signal received.

4. The scrambling code estimation method according to claim 1, wherein the decimated and shifted version, $\tilde{y}$, of the second sequence is obtained from the second sequence y by means of $$\tilde{y}(k)=y(2k)+y(2k+1)+y(2k+4)+y(2k+6)+y(2k+17).$$

5. The scrambling code estimation method according to claim 1, wherein said iterative decoding is a decoding by passing belief messages between nodes of variables and nodes of constraints, said constraints being supplied by the generator polynomial of the first sequence.

6. The scrambling code estimation method according to claim 1, wherein one estimates the scrambling code by:

determining the content ($SR_{Fib}^{\tilde{x}}$) of the shift register of a generator of said shifted and decimated version ($\tilde{x}$) of the first sequence, according to a Fibonacci representation;

determining the content ($SR_{Fib}^{x'}$) of the shift register of a generator of a shifted and non-decimated version of the first sequence in the Fibonacci representation, from the content obtained at the preceding step;

determining the content ($SR_{Fib}^{x}$) of the shift register of the generator of the first sequence in a Fibonacci representation, from the content obtained at the preceding step;

calculating said Gold sequence ($z_n$) as sum of the first sequence obtained at the preceding step, and of the second sequence;

deducing the scrambling code from the Gold code obtained at the preceding step.

7. A scrambling code estimation method used on an uplink of a terminal in a Wideband Code Division Multiple Access (WCDMA) system, a signal transmitted by the terminal on said uplink being transmitted in frames and scrambled with a scrambling code, the scrambling code being constructed from a Gold sequence ($z_n$) obtained as sum of a first ($x_n$) and of a second (y) sequences of maximal length, said method comprising:

sampling samples, at the chip frequency of the scrambling code, the signal received by a receiver;

performing a differential processing of the samples, said differential processing comprising a Hermitian product of successive samples and a calculation of an imaginary part of said Hermitian product, the differential processing supplying a sequence of observable values (v(k));

performing an iterative decoding of the sequence of observables to obtain a third sequence (a), sum of a shifted and decimated version of the first sequence ($\tilde{x}$) and of a shifted and decimated version of the second sequence ($\tilde{y}$);

determining the content ($SR_{Gal}^{a}$) of the shift register of the generator of the third sequence according to a Galois representation;

determining, from the content obtained at the preceding step, the respective contents ($SR_{Fib}^{\tilde{x}}, SR_{Fib}^{\tilde{y}}$) of the shift register of the generator of a shifted and decimated version of the first sequence ($\tilde{x}_n$) and of the shift register of the generator of a shifted and decimated version of the second sequence ($\tilde{y}$), in a Galois representation, and one deduces therefrom the respective contents of the shift registers in a Fibonacci representation;

determining, at a given measuring instant, from the contents of the registers in a Fibonacci representation obtained at the preceding step, the respective contents ($SR_{Gal}^{x}, SR_{Gal}^{y}$) of the registers of generators of the first and second sequences ($x_n$, y) in a Fibonacci representation;

deducing, from the contents of the registers obtained at the preceding step, the first and second sequences, then the scrambling code.

8. The scrambling code estimation method according to claim 7, further comprising determining a content ($SR_{Gal}^{a}$) of the shift register of the generator of the third sequence according to a Galois representation from the content ($SR_{Gal}^{a}$) of the shift register of said generator in a Fibonacci representation, said content being itself obtained as the list of the first bits of the third sequence.

9. The scrambling code estimation method according to claim 7, further comprising deducing from the content of the register of the generator of the second sequence, at a start of frame, and from the content of this same register, determined at the measuring instant, a shift of the measuring instant with respect to the start of frame.

* * * * *